United States Patent Office 2,774,184
Patented Dec. 18, 1956

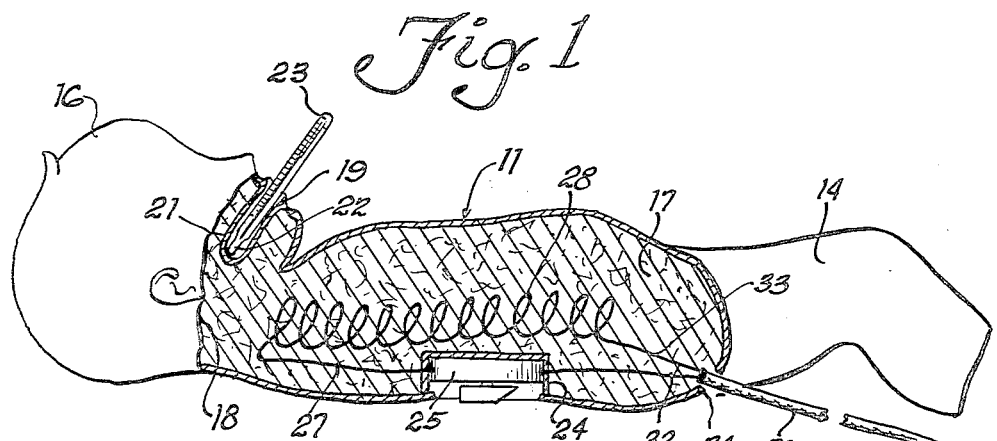
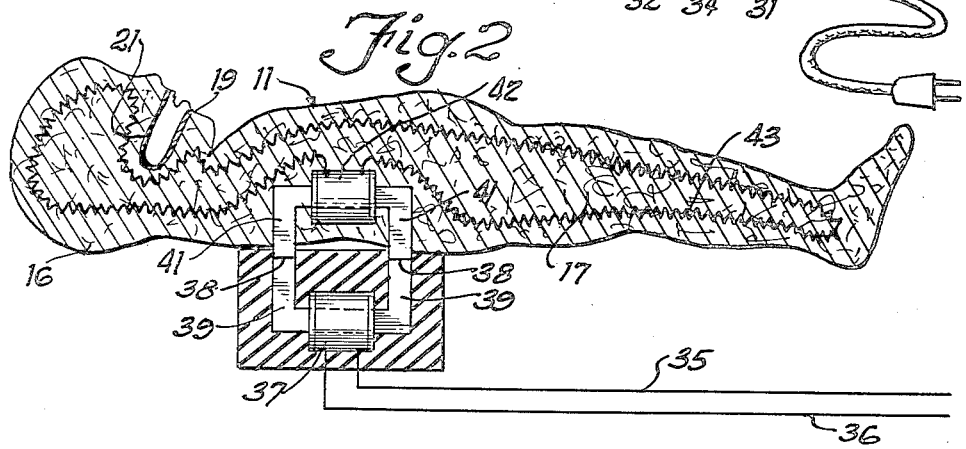
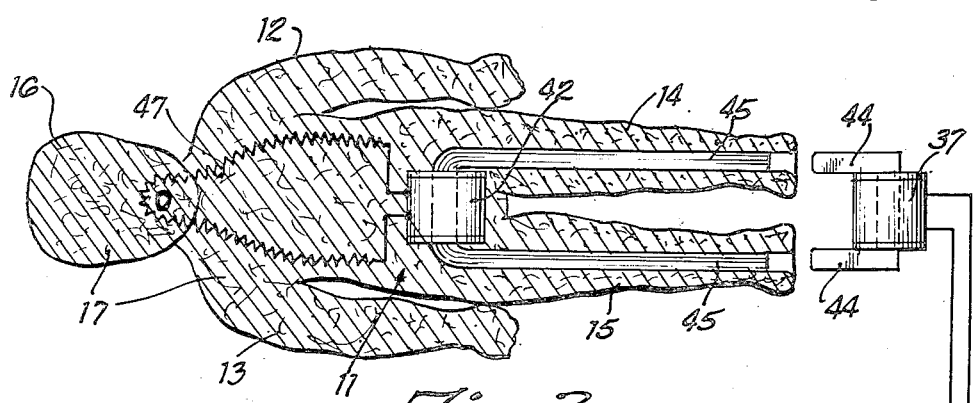

2,774,184

DOLL FOR SIMULATION OF PATHOLOGICAL FEVER

Albert Hefferan, Eastmanville, and George Lester Jones, Marne, Mich.; said Hefferan assignor of fifty percent of his right to G. Lester Jones Application July 10, 1953, Serial No. 367,166

3 Claims. (Cl. 46—234)

The present invention relates to child training and educational toys such as dolls, having self-contained temperature-elevating and temperature-reading means for simulating sickbed attendance.

Child behavior education is notably enhanced by the use of miniature counterparts of adult instrumentalities. Toys which aid in child guidance and indoctrination possess important advantages over other training methods. Through fantasy the child's mind is taught familiarity with adult practices and the way thereby prepared for more advanced thought and training.

For example, the child's attitude toward various medical treating methods may be more successfully molded during active participation rather than under more coercive methods. Such training is ideally accomplished by simulating actual conditions upon inanimate subjects; e. g. dolls, and thus encouraging learning through eagerness during play.

In view of the foregoing it is herein proposed to provide a doll with heating means for simulating a pathological fever condition, and to provide a medical thermometer and a body recess whereby the child, in her character as a nurse or a physician may, by imitation, learn propriety in behavior during illness.

In order to produce the desirable fever symptoms in the doll safely and without unduly encumbering the fantasy, it is proposed to construct dolls of moisture proof encasing material filled with fire resistant padding. Also they may be of conventional construction wherein the electric heating element therewithin contained is locally encased and protected against short-circuiting or other electrical defect. The heating element is preferably a flexible electrical resistance wire distributed throughout the torso of the doll so that the fever condition may be realistically reproduced.

The principal object of the present invention is to provide a doll which is equipped with unobtrusive apparatus for simulating a fever condition by elevating the temperature safely and realistically under selective regulation.

Another object of the present invention is to provide an educational toy of the kind described which is non-inflammable and shock-proof even when given the usual mishandling to which a child's playthings are predominantly subjected.

Yet another object of the present invention is to provide a toy of the kind described which will serve to stimulate the child's imagination and guide it into proper channels of attitude and behaviour, so that the benefits of medical attention may be translated into the immature frame of reference.

These and other objects of the invention will become more evident from the following description taken in conjunction with the accompanying drawing, in which:

Fig. 1 is a side elevational view, with portions broken away, of a doll embodying certain features of the invention;

Fig. 2 is a longitudinal, vertical sectional view through a doll constructed in accordance with certain modifications of the invention; and Fig. 3 is a horizontal, longitudinal, sectional view of a doll in prone position, having embodied therein still other embodiments of the invention.

Referring to the drawing, the torso or principal body section of the doll is indicated at 11. In simulation of a diminutive human figure there extend from the body the arms 12 and 13 (Fig. 3), legs 14 and 15, and a head section 16. Although equally adaptable to an articulated doll, the present invention has been illustrated in conjunction with a non-articulated embodiment, wherein the filler material 17 is shown to occupy continuously the total interior of the torso and appendages.

In order to provide suitable tactility and an appreciable degree of heat conductivity the filler material may be advantageously constructed or comprised of fibrous material such as cotton wadding not having too great a proportion of air spaces. To insure against fire hazard the fibres should be treated with a fireproofing compound, although it is to be noted that the heat range within which the invention is intended to be operated lies well below the combustion levels of most inflammable substances which may otherwise be adapted as a filler.

The material from which the so-called "skin" of the doll is customarily made is adequate in connection with the invention. This includes pliable molded substances of synthetic or rubber composition. In the region of the mouth and lip formation 19 the lining material is formed with an internally extending bladder or pouch 21 preferably integral with the body encasing shell or bonded thereto as may be preferred.

The bladder 21 should have a depth adequate to receive the bulb portion 22 of a conventional or diminutively proportioned but nonetheless properly graduated fever thermometer designed to register heat levels comparable with the temperature range of the human body. This pouch 21, by being made moderately flexible, may be caused to assume normally a closed or nearly closed position and to yield as the thermometer 23 is thrust thereinto.

In the first illustrated example (Fig. 1) the torso 11 is provided on its posterior with a recess 24 within which there may be mounted a rheostat 25 or in lieu thereof a bimetallic heat responsive circuit breaker for limiting the flow of electric current into the circuit 27 to a point whereat the heating element 28 may generate a body heat not to exceed 105° F. or whatever other maximum limit may be regarded as simulating a fever.

The heating element 28 may be confined to the torso 11, or it may be continued into the head protuberance 16 depending upon the heat-conductive characteristic of the filling 17. As has been said, the level of heat generation is, in any event, maintained relatively low and adequately below fire ignition hazard, so that the electrical insulation need be of a very low order, even when compared with the practice with other heat appliances such as electric blankets, etc.

Current for heating the element 28 may be obtained from an external source by means of a service cord 31 which is electrically connected to the circuit terminals 32 and 33 preferably at an unobtrusive entry as at 34.

In the embodiment featured in Fig. 2 the current supply source is shown to be separably associated with the doll, but in this instance heat generation is accomplished by inductive coupling.

Alternating current is introduced over lines 35 and 36 to the primary winding 37 of an iron core transformer of which the core is interrupted at the junction lines 38 between the leg components 39 of the primary winding core section and those 41 of a secondary winding core section contained within the body 11. In series with the secondary winding 42 is a heating element wire 43, in this case shown to course throughout all of the body appendages, including the leg and head sections, and particularly to surround the oral cavity pouch. This arrangement permits a more homogeneous distribution of temperature so that the simulation of fever may be made more realistic. By employing the embodiment of Fig. 2 there is provided an additional factor of safeguard against accidental electric shock such as may result from moisture penetration, exposure or other causes. While the efficacy of the electrical coupling will depend upon firm abutment at the pole surfaces meeting at lines 38, the arrangement will be reasonably stable because of the mutual magnetic attraction between the core components 39 and 41.

In the third embodiment illustrated in Fig. 3 there is taught a construction generally resembling that of Fig. 2 in which the primary winding 37 is made to impress a magnetic flux upon the short-legged core element 44 but in which the secondary winding 42 is relatively more distant from its core element. The remainder of the transformer core is constituted by elongated legs 45 of the secondary portion of the core. Preferably the core portions 45 are made of a plurality of flexible laminations in order to allow a moderate flexure of the legs 14 and 15, and thus to avoid an unnatural rigidity in those appendages.

While the invention has been described with reference to specific embodiments of structure, it will be understood nevertheless that it is susceptible to various changes without departure from the essential scope thereof. Accordingly the foregoing description is not to be regarded as limiting the invention to the precise construction illustrated in the accompanying drawing, nor to the particular language employed in the description, except as comprehended in the appended claims.

The invention claimed is:

1. A doll for simulating pathological fever conditions comprising a scale replica of a human form including torso, head, arm and leg components, an electric heating element contained therein, said heating element having means for connection to a source of electric current, a mouth for said doll constituted as a pouch opening on the exterior of the head component, said pouch being adapted to receive a clinical thermometer, a portion of said heating element being disposed in surrounding relation to said pouch to heat the same in simulation of a pathological fever condition for effecting a reading on the thermometer inserted in said pouch, and filler material surrounding said element and contiguous to said pouch for transmitting the heat of said element to the zone defined by said pouch.

2. A doll for simulating pathological fever conditions comprising a scale replica of a human form including an enclosure defining torso, head, arm and leg components, a filler for said enclosure, an electrical heating element embedded in said filler, said heating element having means for connection to a source of electric current, a mouth for said doll constituted as a pouch, the margin of the pouch being constituted as simulated lips, the opening defined by said lips and pouch being adapted to receive a clinical thermometer, and a portion of said heating element being disposed in surrounding relation to said pouch to heat the same in simulation of a pathological fever condition for effecting a reading on the thermometer inserted in said pouch.

3. The combination in accordance with claim 1 in which said element means comprises an inductive secondary winding for a transformer in series with said element, a core for said winding having portions within the confines of the replica, a primary winding disposed exteriorly of said replica and a core therefor having portions adapted to form a magnetic circuit with said first core to complete a transformer for supplying current to the heating element, and means for connecting the primary winding to a source of current.

References Cited in the file of this patent

UNITED STATES PATENTS

| | | |
|---|---|---|
| 1,352,047 | Boje | Sept. 7, 1920 |
| 1,896,663 | Collins | Feb. 7, 1933 |
| 2,185,190 | Gorbea et al. | Jan. 2, 1940 |
| 2,647,195 | Broyles | July 28, 1953 |
| 2,618,892 | Locks | Nov. 25, 1952 |